United States Patent [19]

French

[11] 4,393,860
[45] Jul. 19, 1983

[54] SOLAR HEAT COLLECTING APPARATUS

[76] Inventor: Paul M. French, 12 James St., Seekonk, Mass. 02771

[21] Appl. No.: 209,729

[22] Filed: Nov. 24, 1980

[51] Int. Cl.³ .............................................. F24J 3/02
[52] U.S. Cl. ................................... 126/429; 126/432
[58] Field of Search .............................. 126/429, 432

[56] References Cited

U.S. PATENT DOCUMENTS

| 4,068,652 | 1/1978 | Worthington | 126/429 |
| 4,108,155 | 8/1978 | Koizumi | 126/429 |
| 4,237,865 | 12/1980 | Lorenz | 126/429 |
| 4,309,983 | 1/1982 | Brill | 126/429 |
| 4,314,548 | 2/1982 | Hanson | 126/429 |

Primary Examiner—Ronald C. Capossela
Attorney, Agent, or Firm—Barlow & Barlow, Ltd.

[57] ABSTRACT

A vertically-oriented solar collecting apparatus primarily for installation in the wall of a building is disclosed in which the panel has a heat collecting plate spaced therefrom and covering an open cell formed in the panel which has lower and upper openings communicating therewith. The cell may be provided with deflecting devices to create turbulence within the cell and the panel has a cover thereover capable of passing the sun's heating rays and forming a heat trap.

1 Claim, 6 Drawing Figures

SOLAR HEAT COLLECTING APPARATUS

BACKGROUND OF THE INVENTION

As a result of the energy crisis, considerable attention has been lately directed to the utilization of solar heat collectors. Predominantly the apparatus that is used is mounted on the roof of a dwelling or building and very little attention has been given to the utilization of heat exchangers installed on vertical building walls, and more particularly doors or other movable openings into a building.

In the prior art the principal attention that has been given to the utilization of solar heat collectors, particularly of the air exchange type, has been collectors that mount on roofs of buildings. Examples of this type of apparatus are seen in the Koizumi et al patent U.S. Pat. No. 4,108,155. In utilizing solar collectors in walls, the only prior art known is seen in U.S. Pat. Nos. 4,068,652 and 4,050,443, and in French Pat. No. 2,303,250. The prior art, however, is singularly lacking in a solar collector heat exchanger which is adapted to be used in movable openings through the walls of a building.

SUMMARY OF THE INVENTION

A solar collector for a removable panel or door in a building is provided which consists essentially of an outer flat metallic sheet, preferably formed from a heat conductive material, such as copper or aluminum, and whose outer surface is blackened for heat absorption purposes. This flat metallic sheet is secured to a vertical panel, such as a door, over an area which has been hollowed-out to form a cell. The cell has communication with the interior of the building by upper and lower openings therein and the cell may be provided with baffles therein in order to slow down the flow of air therein and create a mild turbulence. In order to provide the proper efficiency to the heat exchange or panel, a heat trap formed of transparent material will transmit the solar radiation is supported in spaced relationship to the heat exchanger plate.

DESCRIPTION OF THE PREFERRED EMBODIMENT

Figure 1:
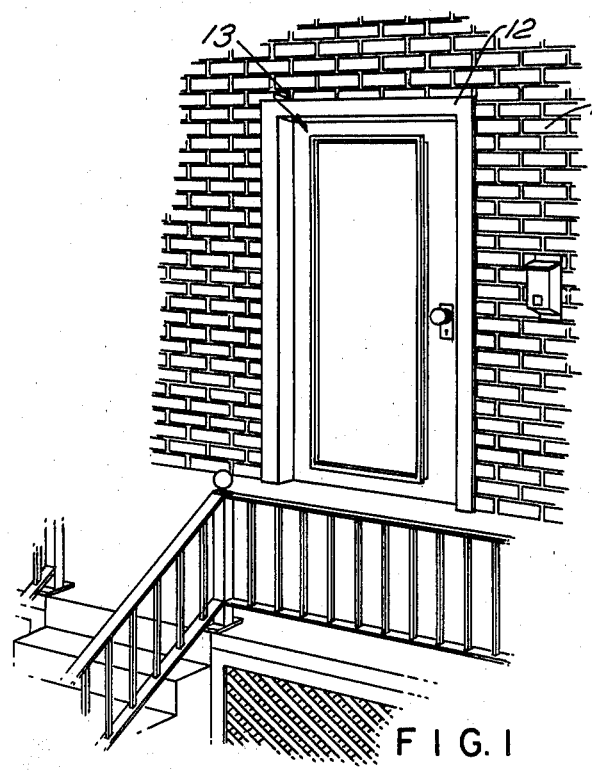
FIG. 1 is a perspective view showing the panel constructed in accordance with the invention installed on a movable opening in the side wall of the building.
Figures 2, 3:
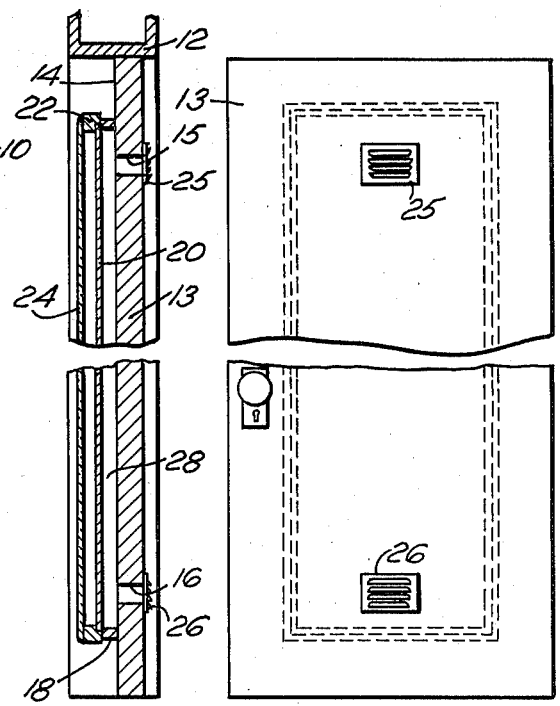
FIG. 2 is a central sectional view through the movable opening shown in FIG. 1.
FIG. 3 is a rear view of the panel.

With reference to FIG. 1 there is shown a portion 10 of a building through which a framework 12 is fitted and into which there is illustrated a door, generally designated 13, that is hinged to the framework in a manner well known to those skilled in the art. As seen in FIG. 2, the door may comprise a solid door and through the solid door there is cut an upper opening 15 and a lower opening 16. On the front face 14 of the door, there is fastened a frame 18 that includes a bottom, side and top sections and to the frame there is affixed a metallic plate 20 which may be further secured to the frame 18 by molding 22. Over the molding there may extend and be fastened thereto a heat trap 24 made of any transparent or semi-transparent material such as glass, fiberglass or the like that is sealed to the molding 22. The outer facing surface of the plate 20 is blackened to impart heat absorbing properties thereto, any conventional blackening material being suitable such as the various coatings that are available. The openings 15 and 16 are preferably covered with louvers 25 and 26 seen best in FIG. 3, and it will be apparent therefore that there is formed between the front face 14 of the door and the metallic plate 20 a cell which is herein designated by the reference numeral 28.

Figure 4:
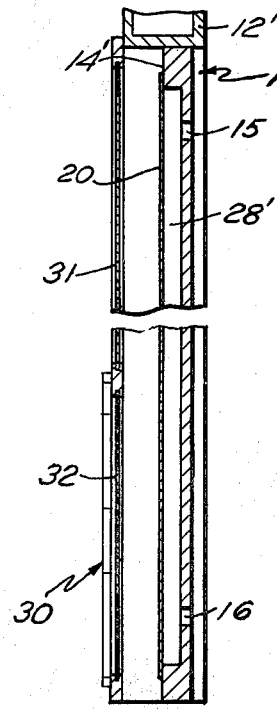
FIG. 4 is a central sectional view of a modified form of the invention.

Referring to FIG. 4 of the drawings, a modified version of the solar heat collecting apparatus is disclosed in which the door 13' has been specially constructed with a recess or cell 28', there being upper and lower openings 15' and 16' that lead into the cell. The door 13' can be made of a variety of materials including metal and to the front surface 14' thereof, there is suitably affixed a metallic plate 20' which seals the cell 28'. In order to provide a suitable heat trap, this type of door configuration may be provided more effectively with the usual storm door generally designated 30 which has transparent or glass panels 31, 32 therein that allow the transmission of solar energy. The storm door may be fitted over the frame 12' into which the door is set in usual fashion, sealing to the framework and by the utilization of gasketing at the bottom or sill portion will be substantially air sealed to the sill. In this fashion solar energy can pass through the panels 31 and 32 and impinge upon the plate 20'.

Figures 5, 6:
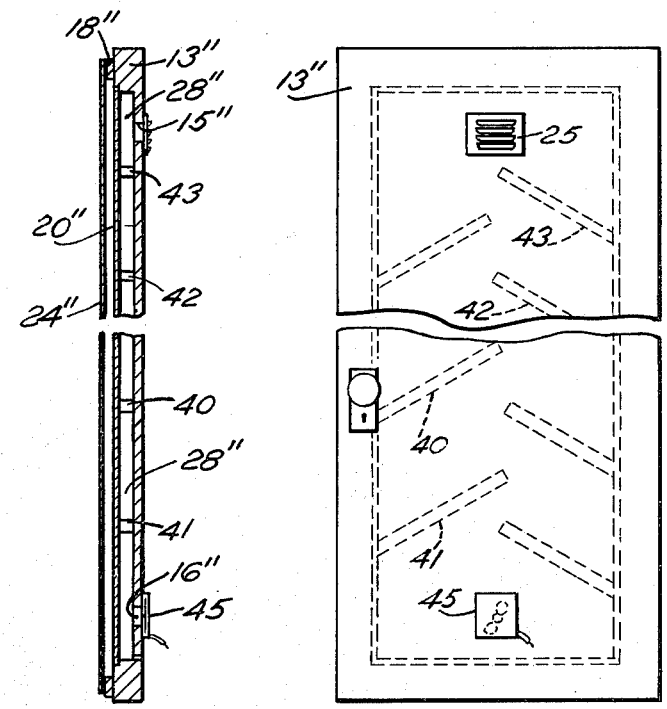
FIG. 5 is a sectional view of a panel of a door that may be made from metallic material that is complete.
FIG. 6 is a rear elevational view showing baffles that may be used with any of the preceding embodiments.

Referring now to FIGS. 5 and 6 of the drawings, there is shown a still further modification of an arrangement where a specially constructed door 13" is provided with a built-in cell 28" which is made by recessing out a substantial portion of the door, and in like fashion to the previous embodiment a metallic plate 20" is suitably set into the door to be substantially flush therewith and in sealing engagement so as to close off the cell 28". In order to provide suitable heat trap, a framework 18" extends about and over the entire plate 20" area and affixed to the framework is a heat trap made of transparent or semi-transparent material that is designated 24". In this particular arrangement a number of air deflecting devices in the form of baffles such as are designated 40, 41, 42 and 43 have been provided, their arrangement being somewhat oblique to the general longitudinal extent of the door panel. As seen better in FIG. 6, these members are arranged so that as air rises from the bottom of the panel to the top of the panel it is forced to follow a turbulent or tortuous path. The door 13" is also fitted with a lower opening 16" and an upper opening 15" and over the opening 16" there is fitted an electric fan 45 which will force air into the cell area 28", there being a register 25" fitted over the opening 15".

The operation of the device will be readily apparent from the brief description above, it being understood that the panel should generally face in a southerly direction so that solar rays will be directed onto the heat trap 24 and thence on to the metallic plate 20 where the ultraviolet rays are and other solar energy is absorbed by the black coating over the metallic panel 20. Cold air will be naturally drawn into the opening 16, either naturally or by the fan 45, and will pass upwardly through the cell 28 where it is heated and then will be discharged through the opening 15 at the top of the panel. It will be further apparent that there is an advantage to a vertical panel or door type installation which has a normal vertical attitude in view of the fact that a chimney effect takes place where air will naturally flow in through the lower opening 16 and out the upper opening 15.

In some instances, the combination of the FIG. 2 arrangement with a glass door 30 will enhance the operation as a further insulating area is provided between the door 30 and the heat trap 24.

What is claimed is:

1. A hot air type solar heat-collecting apparatus comprising
   (a) an upwardly extending outer door panel fitted into a wall of a building within a frame with openings therethrough at different vertical levels, said panel being so oriented as to receive the rays of the sun,
   (b) a heat-collecting plate having a substantially black coating over its surface spaced from said panel and covering said openings and forming with said panel a closed heat chamber except for said openings,
   (c) a heat trap cover capable of passing sun's heating rays covering said plate whereby the sun's rays will pass through said cover and impinge upon said plate and heat air in said chamber.

* * * * *